(12) United States Patent
Simsek

(10) Patent No.: US 10,069,742 B2
(45) Date of Patent: Sep. 4, 2018

(54) ESTIMATING THE PROBABILITY THAT A DATA PACKET WILL BE RECEIVED AND A DATA PACKET TRANSMISSION RATE

(71) Applicant: VOLKSWAGEN AG, Wolfsburg (DE)

(72) Inventor: Burak Simsek, Braunschweig (DE)

(73) Assignee: Volkswagen AG (DE)

( * ) Notice: Subject to any disclaimer, the term of this patent is extended or adjusted under 35 U.S.C. 154(b) by 29 days.

(21) Appl. No.: 15/307,381

(22) PCT Filed: Apr. 7, 2015

(86) PCT No.: PCT/EP2015/057459
§ 371 (c)(1),
(2) Date: Oct. 28, 2016

(87) PCT Pub. No.: WO2015/165692
PCT Pub. Date: Nov. 5, 2015

(65) Prior Publication Data
US 2017/0048156 A1 Feb. 16, 2017

(30) Foreign Application Priority Data

Apr. 29, 2014 (DE) .......................... 10 2014 208 084

(51) Int. Cl.
*H04W 4/12* (2009.01)
*H04L 12/825* (2013.01)
(Continued)

(52) U.S. Cl.
CPC ........... *H04L 47/25* (2013.01); *H04B 17/101* (2015.01); *H04B 17/309* (2015.01);
(Continued)

(58) Field of Classification Search
CPC ... H04L 1/0002; H04L 43/0829; H04L 47/25; H04L 47/263
See application file for complete search history.

(56) References Cited

U.S. PATENT DOCUMENTS 7,835,749 B1 11/2010 Hart et al.
2004/0246919 A1 12/2004 Larsson
(Continued)

FOREIGN PATENT DOCUMENTS

DE 102010056158 A1 6/2012
EP 1069721 A2 1/2001
(Continued)

OTHER PUBLICATIONS

Search Report for German Patent Application No. 10 2014 208 084.3; dated Aug. 25, 2014.
(Continued)

*Primary Examiner* — Charles C Jiang
*Assistant Examiner* — Will Lin
(74) *Attorney, Agent, or Firm* — Barnes & Thornburg LLP

(57) ABSTRACT

A method for estimating the probability that a data packet wirelessly transmitted from a transmitter, which is a traffic infrastructure object or a vehicle, to a receiver will be received. The method includes estimating a signal quality of the data packet and estimating the probability that the data packet will be received on the basis of the estimated signal quality.

11 Claims, 2 Drawing Sheets

(51) Int. Cl.
 *H04L 1/00* (2006.01)
 *H04L 25/06* (2006.01)
 *H04B 17/309* (2015.01)
 *H04B 17/10* (2015.01)
 *H04W 24/00* (2009.01)
 *H04L 1/20* (2006.01)
 *H04W 4/70* (2018.01)

(52) U.S. Cl.
 CPC .......... *H04L 1/0002* (2013.01); *H04L 25/067* (2013.01); *H04B 17/102* (2015.01); *H04B 17/103* (2015.01); *H04L 1/20* (2013.01); *H04W 4/70* (2018.02)

(56) References Cited

U.S. PATENT DOCUMENTS

| | | | |
|---|---|---|---|
| 2005/0169232 A1* | 8/2005 | Sakoda | H04L 1/0002 370/347 |
| 2007/0041322 A1 | 2/2007 | Choi et al. | |
| 2009/0147678 A1* | 6/2009 | Xhafa | H04L 1/0002 370/232 |
| 2011/0019557 A1* | 1/2011 | Hassan | H04L 47/10 370/252 |
| 2011/0059735 A1 | 3/2011 | Thiel et al. | |
| 2012/0263055 A1 | 10/2012 | Liu et al. | |
| 2013/0083679 A1* | 4/2013 | Krishnaswamy | G08G 1/093 370/252 |
| 2013/0095748 A1 | 4/2013 | Hu et al. | |
| 2014/0269357 A1* | 9/2014 | Dhakal | H04L 5/0048 370/252 |
| 2015/0126241 A1* | 5/2015 | Hwang | H04W 52/267 455/522 |

FOREIGN PATENT DOCUMENTS

| | | |
|---|---|---|
| EP | 1521384 A2 | 4/2005 |
| EP | 1821435 A1 | 8/2007 |
| WO | 2006055646 A2 | 5/2006 |

OTHER PUBLICATIONS

Search Report for International Patent Application No. PCT/EP2015/057459; dated Dec. 14, 2015.

* cited by examiner

ESTIMATING THE PROBABILITY THAT A DATA PACKET WILL BE RECEIVED AND A DATA PACKET TRANSMISSION RATE

PRIORITY CLAIM

This patent application is a U.S. National Phase of International Patent Application No. PCT/EP2015/057459, filed 7 Apr. 2015, which claims priority to German Patent Application No. 10 2014 208 084.3, filed 29 Apr. 2014, the disclosures of which are incorporated herein by reference in their entirety.

SUMMARY

Illustrative embodiments relate to a method and a device for estimating the probability that a data packet will be received, the data packet being transmitted wirelessly from a vehicle to a receiver (i.e., another vehicle). In addition, the illustrative embodiments relate to a method and a device for defining the transmission rate at which data packets are transmitted wirelessly from the vehicle to the receiver.

BRIEF DESCRIPTION OF THE DRAWINGS

Disclosed embodiments are described in detail below with reference to the figures.

DETAILED DESCRIPTION OF THE DISCLOSED EMBODIMENTS

Figure 1:
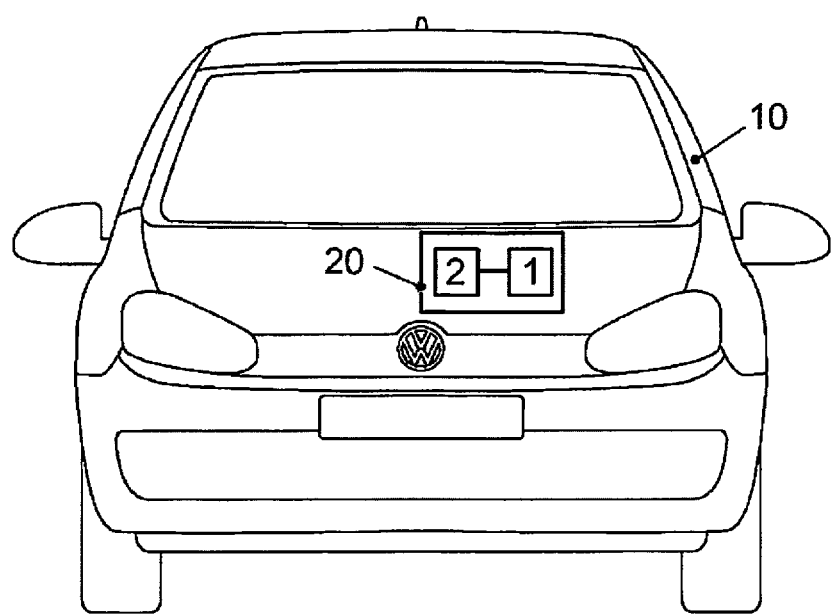
FIG. 1 shows schematically a disclosed vehicle with a disclosed device.

DE 10 2010 056 158 A1 describes a method for setting a receiving parameter of a receiving device in a vehicle, wherein the device receives data packets.

In future, numerous information elements will be transmitted between vehicles or between a vehicle and an infrastructure, this also being known as Car2Car or Car2X communication. Each vehicle transmits information data packets without receiving an acknowledgement to indicate whether the information or the data packets are correctly received by the receiver. To deliver the information as reliably as possible to the receiver under these conditions, each vehicle operates, according to one approach from the prior art, at a maximum transmission rate which is defined according to the corresponding standard. The transmission rate is understood to mean a type of repetition rate at which the information to be transmitted is transmitted in a periodically repeated manner. However, operation at the maximum transmission rate increases the probability of data packet collisions and, in a manner of speaking, clogs up the data channels, which in turn reduces the probability of a successful information transfer.

Disclosed embodiments set the transmission rate at which information is transmitted from a vehicle to a receiver, depending on the probability that the information will be received at the receiver, in such a way that the probability of a successful information transfer is as high as possible or adheres to a specified threshold value.

Disclosed embodiments provide a method for estimating the probability that a data packet will be received, a method for defining a transmission rate, and a device.

According to the disclosed embodiments, a method is provided for estimating the probability that a data packet will be received, the data packet being transmitted wirelessly or via a radio link from a transmitter, which is a traffic infrastructure object (e.g., a "Road Site Unit") or a vehicle, to a receiver (for example, another vehicle or another traffic infrastructure object). The disclosed method comprises the following operations:

Estimating a signal quality of the data packet received by the receiver.

Estimating the probability that the data packet received by the receiver will be received, depending on the estimated signal quality.

In this disclosed embodiment, the traffic infrastructure object may be a stationary traffic infrastructure object, for example, a set of traffic lights or a fixed traffic sign, or a mobile traffic infrastructure object, for example, a trailer of a construction vehicle.

The signal quality of the data packet(s) received by the receiver is estimated without an acknowledgement from the receiver, as a result of which an additional data transmission load (due to the acknowledgements) is eliminated. The transmission rate can then be adapted by means of the estimation of the receive probability in such a way that the probability of a successful information transfer attains or exceeds a specified threshold value.

The disclosed method comprises the following further operations:

Receiving a data packet in the vehicle or traffic infrastructure object itself to define the signal quality of this data packet.

Adapting the estimated signal quality depending on the data packet received by the vehicle or traffic infrastructure object itself depending on the measured signal quality.

Assuming that no information relating to the signal quality of the data packets received by the receiver is transmitted by the receiver, the signal quality of the data packets which are received in the vehicle or the traffic infrastructure object itself is defined according to this disclosed embodiment. Depending on this signal quality, the signal quality estimated for the receiver is then adapted and the probability that the data packets will be received by the receiver is estimated by means of this adapted signal quality. In other words, according to this disclosed embodiment, it is, in a manner of speaking, assumed that the signal quality (and therefore the receive probability) of the data packets received by the receiver corresponds to the signal quality (and therefore the receive probability) of the data packets received by the transmitter (i.e., in the vehicle or the traffic infrastructure object), or the signal qualities at least behave similarly.

The signal quality is defined depending on one or more parameters or factors which can be selected from the following group:

An antenna gain of at least one antenna of the vehicle or traffic infrastructure object. A distinction can be made between the antenna gain in the transmission of data packets and the antenna gain in the reception of data packets. If the vehicle or traffic infrastructure object uses a different antenna for transmitting the data packets than for receiving the data packets, the signal quality can be defined depending on the antenna gain of the transmit antenna and/or on the antenna gain of the receive antenna. In this case, the antenna gain may correspond to the sum of the antenna gain of the transmit antenna and the antenna gain of the receive antenna. Generally speaking, the higher the antenna gain, the better the signal quality.

A transmit power of the transmit antenna of the vehicle or traffic infrastructure object. The higher the transmit power is set, the higher the signal quality should be.

A distance between the vehicle or traffic infrastructure object and the receiver. The shorter the distance, the higher or better the signal quality will generally be.

A coefficient or factor with which distance-dependent effects which alter the signal quality between the transmitter and the receiver are taken into account.

An attenuation of the signal power of the data packet due to environmental factors which are dependent on the current environment of the vehicle or traffic infrastructure object. The higher this attenuation is, the lower the signal quality will be.

A mean transmission error which depends on the current environment of the vehicle or traffic infrastructure object. The mean transmission error is understood as a mean value of the transmission error over time. The higher this mean transmission error is, the lower the signal quality will be.

An individual transmission error which applies only to the transmission of data packets between the transmitter and a specific receiver. In other words, an individual transmission error exists in each case for each receiver of the vehicle or traffic infrastructure object. By means of the individual transmission error, the fact is taken into account that the antenna gain of the receiver and the effects of the vehicle body and the underlying vehicle architecture of the received vehicle are not known. The individual transmission error is used if a data packet previously transmitted by the receiver has been received by the transmitter.

According to the disclosed embodiments, the following three options exist for defining the distance between the transmitter and receiver:

The location of the receiver is contained in a data packet previously received in the transmitter from the receiver. The distance between the transmitter and the receiver can be defined through the knowledge of the location of the receiver.

Important locations (e.g., an intersection) are defined, for example, by means of a map. The distance between the transmitter and one of the important locations is defined in each case as the distance between the transmitter and the receiver.

Depending on information that is to be transferred by the respective data packet (e.g., a warning of roadworks), a minimum distance is defined up to which the data packet is intended to be received with a predefined probability (e.g., 99%). This minimum distance is then used as the distance between the transmitter and the receiver.

The signal quality, e.g., in dBm, can then be defined under the assumption of a logarithmic normal distribution, e.g., according to the following equation (1):

$$SQ=AG+TP-v*\log_{10}(d)-w+e_E+e_V \quad (1),$$

where AG corresponds to the antenna gain, e.g., in dBm, of the at least one antenna of the vehicle or traffic infrastructure object, TP corresponds to the transmit power, e.g., in dBm, of the transmit antenna of the vehicle or traffic infrastructure object, d corresponds to the distance, e.g., in meters, between the transmitter and the receiver, v corresponds to the coefficient with which the distance-dependent effects which alter the signal quality between the transmitter and the receiver are taken into account, w corresponds to the attenuation, e.g., in dBm, of the signal power of the data packet due to environmental factors, $e_E$ corresponds to the mean transmission error, e.g., in dBm, und $e_V$ corresponds to the individual transmission error, e.g., in dBm.

The transmit power TP and the distance d may be time-dependent, so that, in this case, the calculated signal quality SQ is also time-dependent, so that the signal quality can be estimated more or less in real time.

For example, in the urban areas of Frankfurt, the values are 22.3 for the coefficient v and 52.95 dBm for the attenuation w, whereas these values for forested areas in Frankfurt are 15.96 for the coefficient v and 65.59 dBm for the attenuation w.

Since the antenna gain and the transmit power in the receiver are not known, the antenna gain and the transmit power of the at least one antenna of the vehicle or traffic infrastructure object are used instead to estimate the signal quality.

With regard to the use of the equation (1) described above, the possibility exists, on the one hand, that the mean transmission error and the individual transmission error are known in that they are defined, for example, on the basis of a measured signal quality of data packets that have been received in the vehicle or traffic infrastructure object itself. On the other hand, the possibility exists that the mean transmission error and the individual transmission error are not known, so that the signal quality SQ is defined without these two transmission errors, as indicated in the following equation (1a):

$$SQ=AG+TP-v*\log_{10}(d)-w \quad (1a).$$

In the case where the data packet is transmitted from the transmitter (from the vehicle) via an intermediate station or intermediate device to the receiver, the distance d can be defined by the product of the distance a1 between the transmitter and the intermediate station and the distance a2 from the intermediate station to the receiver, so that d=a1*a2 applies.

As already indicated above, the mean transmission error and/or the individual transmission error can be defined on the basis of data packets which are received in the vehicle or traffic infrastructure object itself and which originate, for example, from other vehicles or infrastructure devices. For this purpose, a receive power which is currently present in the receive antenna when data packets are received is measured or defined. The mean transmission error and/or the individual transmission error can then be defined or adapted on the basis of a comparison between the signal quality which is defined as described above and the defined receive power.

According to at least one disclosed embodiment, the current position of the transmitter is defined. Known values are then used for the coefficient v and/or for the attenuation w and/or for the mean transmission error eE and/or for the individual transmission error eV depending on the position. These values may, for example, have been predefined by the vehicle itself, by another vehicle or otherwise. These values may be stored in the transmitter itself or may be located in a memory disposed outside the transmitter. In the second case, these values may be requested by the transmitter via a (usually wireless) communication and may then be used to estimate the most accurate possible signal quality.

This disclosed embodiment enables the signal quality to be defined by means of equation (1) or equation (1a), even if the vehicle or traffic infrastructure object has not yet received a data packet.

The following procedure, for example, can be followed for the signal quality estimation:

A location is determined at which the signal quality is to be defined.

The distance d between the vehicle or infrastructure object and the location is determined.

The signal quality is determined by means of equation (1), insofar as the vehicle or traffic infrastructure object has already received data packets in the current environment and from the corresponding receiver, wherein the mean transmission error and the individual transmission error can defined by means of the data packets. Alternatively, the signal quality is determined by means of equation (1a) if the mean transmission error and the individual transmission error cannot be defined and are not known.

The signal quality for the transmission of data packets from the vehicle or traffic infrastructure object to a receiver at any given location can be more or less estimated by means of the procedure outlined above.

The receive probability Pr can also be determined on the basis of the signal quality SQ using a logit model, for example, using the following equation (2). A logit model or logistic regression is understood to mean a regression analysis for modelling the distribution of discrete dependent variables.

$$P_r = \frac{1}{1 + e^{a + b \cdot SQ + c \cdot CL}}, \quad (2)$$

where CL corresponds to a percentage channel load of the vehicle or traffic infrastructure object, and the variables a, b, c are constants which are dependent on the current environment of the vehicle. For example, a=−18.4879, b=−0.20341 and c=5.94928 apply to Frankfurt.

The percentage channel load can be defined by a ratio of the slots or timeslots defined as "BUSY" to all slots available in a predefined time interval (e.g., the last 100 ms). A slot is identified as "BUSY" if it already contains information, e.g., from another data packet (e.g., from another vehicle) or another traffic infrastructure object, so that this slot cannot be used to transmit the data packet to the receiver.

According to the disclosed embodiments, a method for defining a transmission rate is also provided, wherein the transmission rate indicates a rate at which data packets are transmitted wirelessly from a transmitter which is a vehicle or a traffic infrastructure object (e.g., a "Road Site Unit") to a receiver. The disclosed method comprises the following operations for defining the transmission rate:

Estimating a receive probability which is transmitted wirelessly from the vehicle or traffic infrastructure object and is received in a receiver.

Defining the transmission rate depending on a specified theoretical receive probability and the predefined receive probability.

By the disclosed method for defining the transmission rate, the transmission rate can be set in such a way that the probability that data packets will be correctly received at the receiver corresponds to the specified theoretical receive probability.

The transmission rate f can be defined in the unit Hz with the following equation (3):

$$f = \frac{\log(1 - P_Y)}{\log(1 - P_r)}, \quad (3)$$

where $P_y$ corresponds to the theoretical receive probability and $P_r$ corresponds to the predefined receive probability.

The predefined receive probability is determined using the method for estimating the receive probability described above.

According to the disclosed embodiments, a device is also provided for a vehicle or infrastructure object (e.g., a "Road Site Unit") which comprises at least one antenna and control means. The device is designed to estimate or define a signal quality of a received data packet using the control means, the data packet being transmitted wirelessly with the at least one antenna from the device to a receiver. The control means are designed to estimate or define the probability that the received data packet will be received, depending on the estimated signal quality.

The benefits of the disclosed device essentially correspond to the benefits of the disclosed method for estimating the probability that the data packet will be received, as explained in detail above, so that there is no need to repeat them here.

The disclosed device is designed to carry out the disclosed method for estimating the probability that a data packet will be received.

According to the disclosed embodiments, a further device is also provided for a vehicle or a traffic infrastructure object (e.g., a "Road Site Unit"), the further device comprising at least one antenna and control means. The further device is designed to estimate, using the control means, the probability that a data packet will be received, the data packet being transmitted wirelessly from the further device to a receiver. The control means are designed to define the transmission rate at which data packets are transmitted wirelessly from the further device to the receiver, depending on a specified theoretical receive probability and the predefined receive probability.

The benefits of the further disclosed device essentially correspond to the benefits of the disclosed method for defining a transmission rate, the benefits having been explained in detail above, so that there is no need to repeat them here.

The further disclosed device is designed to carry out the disclosed method for defining a transmission rate.

Finally, according to the disclosed embodiments, a vehicle or traffic infrastructure object (e.g., a "Road Site Unit") is provided which comprises a device and/or a further device.

The disclosed embodiments enable the definition or calculation of an optimum transmission rate for data packets without the need for an acknowledgement from receivers of the data packets for this purpose. As a result, the transmission rate for transmitting the data packets to different vehicles or traffic infrastructure objects can be set in such a way that the probability that the data packets will be received in the receiver meets a corresponding specification without too many data packets being transmitted unnecessarily, so that no data congestion occurs.

The disclosed embodiments are suitable for motor vehicles, but also for traffic infrastructure objects (e.g., Road Site Units) which transmit information data packets to (other) vehicles or traffic infrastructure objects. The disclosed embodiments are obviously not restricted to this field of application, since the disclosed embodiments can also be used in ships or aircraft and track-guided or rail-borne vehicles. In addition, the disclosed embodiments can also be used in mobile devices (e.g., Smartphones).

FIG. 1 shows schematically a vehicle 10 which comprises a device 20. This device 20 in turn comprises an antenna 1 and control means 2. The antenna 1 is an antenna with which data packets can be transmitted and also received by the device 20 or by the vehicle 10. Using the control means 2, the device 20 estimates the signal quality of a data packet which is transmitted wirelessly via the antenna 1 and is received by a receiver (not shown). The control means 2 then define the probability that that data packet will be correctly received by the receiver on the basis of the signal quality. Depending on the defined receive probability and a specified theoretical receive probability, the control means can then define a transmission rate at which the device 20 transmits data packets to the receiver, so that the probability that these data packets will be received in the receiver corresponds to the specified theoretical receive probability.

Figure 2:
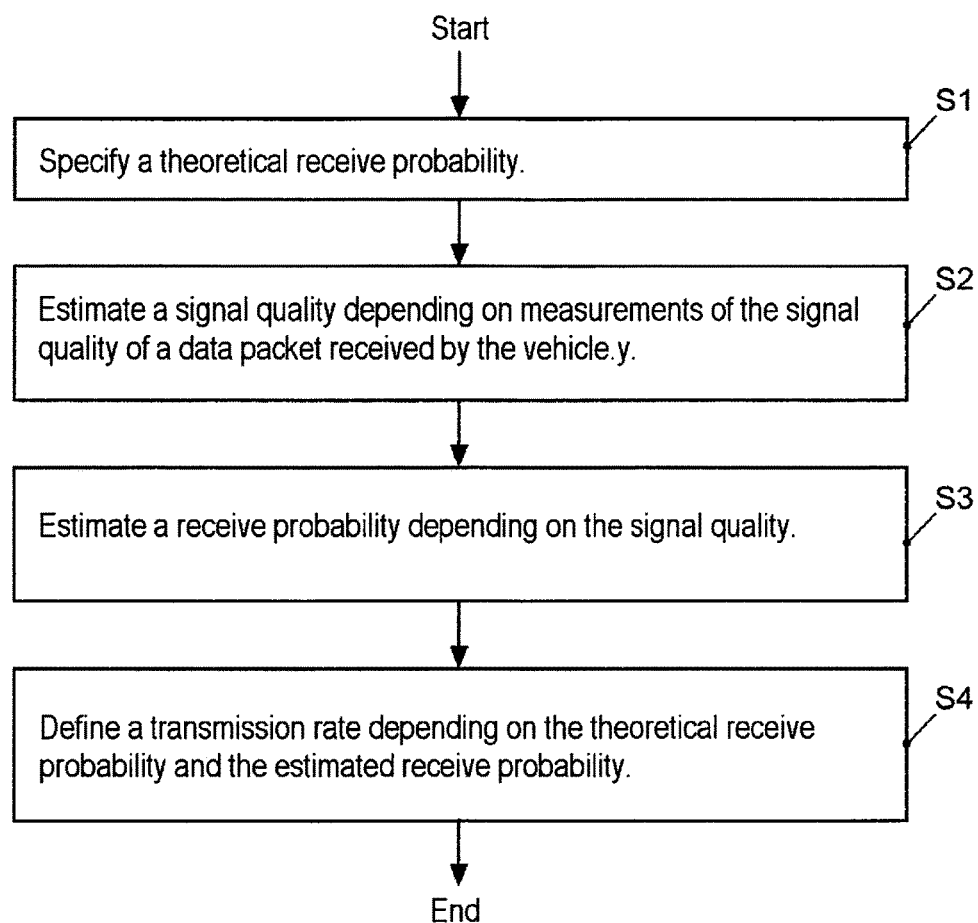
FIG. 2 is a flow diagram of a disclosed method for defining a transmission rate.

FIG. 2 shows a flow diagram of a method for defining the transmission rate at which data packets are to be transmitted from a vehicle to a receiver, so that a specified theoretical receive probability is adhered to in the receiver.

In operation at S1, the theoretical receive probability is specified. In operation at S2, the signal quality of data packets which are received by the vehicle 10 is measured. The signal quality with which the data packets transmitted by the vehicle are received by the receiver is estimated on the basis of this measured signal quality. In operation at S3, the probability that a data packet transmitted by the vehicle 10 will be correctly received by the receiver is estimated, depending on the signal quality estimated in operation at S2. Finally, in operation at S4, the transmission rate is defined on the basis of the specified theoretical receive probability and the receive probability estimated in operation at S3. If the data packets are transmitted at this defined transmission rate from the vehicle 10 or from the device 20 to the receiver, the probability that the data packets will be received in the receiver should correspond to the theoretical receive probability.

In the case of safety-related functions, for example, for the emergency braking assistant, an error-free transmission of data packets between vehicles is of crucial importance. If data packets with which an emergency braking is to be initiated in the receiving vehicle to prevent a collision are not received in a timely manner or correctly, the Car2Car communication offers no benefit. The disclosed embodiments considerably increase the probability of the error-free and timely transmission of the data packets between vehicles, which is of great importance for safety-related functions.

REFERENCE NUMBER LIST

1 Antenna
2 Control means
10 Vehicle
20 Device
S1-S4 Method operation

The invention claimed is:

1. A method for estimating the probability that a data packet will be received by a traffic infrastructure object or a transportation vehicle, the data packet being transmitted wirelessly from a transmitter to a receiver,
wherein the transmitter is another traffic infrastructure object or another transportation vehicle, and the method comprising:
estimating a signal quality of the data packet without acknowledgement from the receiver; and
estimating the probability that the data packet will be received based on the estimated signal quality,
wherein the receive probability $P_r$ is defined with the following equation:

$$P_r = \frac{1}{1 + e^{a+b \cdot SQ + c \cdot CL}}$$

wherein SQ corresponds to the signal quality,
wherein CL corresponds to a percentage channel load of the transmitter, and
wherein a, b, c are constants which are dependent on the current environment of the transmitter.

2. The method of claim 1, further comprising:
receiving a second data packet by the transmitter; and
adapting the estimation of the signal quality based on the received second data packet.

3. The method of claim 1, wherein the signal quality is defined at least depending on a parameter which is selected from a group consisting of:
an antenna gain of at least one antenna of the transmitter,
a transmit power of the at least one antenna of the transmitter,
a distance between the transmitter and the receiver,
a coefficient for distance-dependent effects which alter the signal quality,
an attenuation of a signal power of the data packet based on environmental factors which are dependent on a current environment of the transmitter,
a mean transmission error which is dependent on the current environment of the transmitter, and
an individual transmission error which is dependent on the transmission between the transmitter and the receiver.

4. The method of claim 3, wherein the signal quality is defined with the following equation:

$$SQ = AG + TP - v * \log_{10}(d) - w + e_E + e_V,$$

wherein AG corresponds to the antenna gain of the at least one antenna of the transmitter,
wherein TP corresponds to the transmit power of the at least one antenna of the transmitter,
wherein d corresponds to the distance between the transmitter and the receiver,
wherein v corresponds to the coefficient for distance-depending effects,
wherein w corresponds to the attenuation due to distance-dependent effects,
wherein $e_E$ corresponds to the mean transmission error, and
wherein $e_V$ corresponds to the individual transmission error.

5. The method of claim 4, wherein the data packet is transmitted from the transmitter via an intermediate device to the receiver, and
the distance d is defined by a product of a distance from the transmitter to the intermediate device and a distance from the intermediate device to the receiver.

6. The method of claim 3, wherein a receive power currently received by the at least one antenna of the transmitter is defined in the reception of a data packet, and
the mean transmission error and/or the individual transmission error is/are defined depending on a comparison of the defined signal quality and the receive power.

7. The method of claim 3, wherein a current position of the transmitter is defined, and predefined values are used for the coefficient for distance-dependent effects which alter the signal quality and/or for the attenuation of the receive power of the antenna and/or for the mean transmission error and/or for the individual transmission error depending on the position.

8. A method for defining a transmission rate at which data packets are transmitted wirelessly from a transmitter to a receiver,
   wherein the transmitter is a traffic infrastructure object or a transportation vehicle, and the receiver is another traffic infrastructure object or another transportation vehicle,
   the method comprising:
   estimating the probability that a data packet will be received, the data packet being transmitted wirelessly from the transmitter to the receiver, and
   defining the transmission rate depending on a specified theoretical receive probability and a predefined receive probability without acknowledgement from the receiver;
   wherein the receive probability is estimated with the method of claim 1.

9. The method of claim 8, wherein the transmission rate f is defined with the following equation:

$$f = \frac{\log(1 - P_Y)}{\log(1 - P_r)}$$

wherein f corresponds to the transmission rate per second,
wherein $P_y$ corresponds to the theoretical receive probability, and
$P_r$ corresponds to the predefined receive probability.

10. A device for an infrastructure object or a transportation vehicle, the device comprising:
   at least one antenna; and
   a controller,
   wherein the device estimates a signal quality of a received data packet using the controller, the data packet being transmitted wirelessly by the at least one antenna from the device to a receiver, and
   wherein the controller estimates the probability that the received data packet will be received by a traffic infrastructure object or a transportation vehicle, depending on the signal quality without acknowledgement from the receiver,
   wherein the receive probability $P_r$ is defined with the following equation:

$$P_r = \frac{1}{1 + e^{a + b \cdot SQ + c \cdot CL}}$$

wherein SQ corresponds to the signal quality,
wherein CL corresponds to a percentage channel load of the transmitter, and
wherein a, b, c are constants which are dependent on the current environment of the transmitter.

11. The device of claim 10, wherein the device carries out a method for estimating the probability that a data packet will be received, the data packet being transmitted wirelessly from a transmitter to a receiver, wherein the transmitter is a traffic infrastructure object or a vehicle, and the method comprises:
   estimating a signal quality of the data packet; and
   estimating the probability that the data packet will be received based on the estimated signal quality.

* * * * *